United States Patent
Yoon et al.

(10) Patent No.: US 10,246,027 B2
(45) Date of Patent: Apr. 2, 2019

(54) BICYCLE CARRIER FOR VEHICLE

(71) Applicants: Il Shik Yoon, Gyeonggi-Do (KR); Jun Chan Yoon, Seoul (KR)

(72) Inventors: Il Shik Yoon, Gyeonggi-Do (KR); Jun Chan Yoon, Seoul (KR)

( * ) Notice: Subject to any disclaimer, the term of this patent is extended or adjusted under 35 U.S.C. 154(b) by 0 days.

(21) Appl. No.: 15/542,477

(22) PCT Filed: Sep. 10, 2015

(86) PCT No.: PCT/KR2015/009515
§ 371 (c)(1),
(2) Date: Jul. 10, 2017

(87) PCT Pub. No.: WO2016/114471
PCT Pub. Date: Jul. 21, 2016

(65) Prior Publication Data
US 2018/0272956 A1    Sep. 27, 2018

(30) Foreign Application Priority Data
Jan. 12, 2015  (KR) ........................ 10-2015-0004144

(51) Int. Cl.
*B60R 9/10*   (2006.01)
*B60R 9/06*   (2006.01)
*B60R 9/042*  (2006.01)

(52) U.S. Cl.
CPC ................. *B60R 9/10* (2013.01); *B60R 9/06* (2013.01); *B60R 9/042* (2013.01)

(58) Field of Classification Search
CPC ... B60R 9/10; B60R 9/06; B60R 9/042; Y10S 224/924
See application file for complete search history.

(56) References Cited

U.S. PATENT DOCUMENTS 3,931,919 A * 1/1976 Gerber ...................... B60R 9/10
224/324
5,360,151 A * 11/1994 Fine ........................ B60R 9/042
224/309

(Continued)

FOREIGN PATENT DOCUMENTS

| DE | 29721292 U1 * | 2/1998 | ............. B60R 9/042 |
| GB | 2557188 A * | 6/2018 | ................ B60P 3/06 |
| JP | 2010042805 A * | 2/2010 | ................ B60R 9/10 |

*Primary Examiner* — Justin Larson
(74) *Attorney, Agent, or Firm* — Richard John Bartz (57) ABSTRACT

The present invention relates to a bicycle carrier for a vehicle which allows a bicycle to be safely fixed and transported upside down, and the bicycle carrier includes: a vertical support 20 which is rotatably connected to a base support rod 10; a horizontal support 30 which is rotatably connected to the base support rod 10 so as to form a fixed angle with the vertical support 20; a bicycle holder 40 which is rotatably connected to the base support rod 10; an angle fixing holder 50 which is connected between the horizontal support 30 and the bicycle holder 40 so as to fix an angle between the horizontal support and the bicycle holder; two handlebar fixing holders 60 which are slidably installed at both sides of the base support rod 10; a bicycle frame fixing holder 70 which fixes a horizontal frame 120 of the bicycle; and three fixing straps (80, 82, 83, and 84) which are adjustable in length, in which the three fixing straps 80 are fixed to the vehicle and securely tightened, a bicycle 100 is turned upside down, the bicycle horizontal frame 120 is fixed to the bicycle frame fixing holder 70, and then handlebars 110at both sides of the bicycle are fixed to the two handlebar fixing holders 60, respectively, such that the bicycle may be safely fixed to the vehicle and may be transported.

7 Claims, 7 Drawing Sheets

(56) References Cited

U.S. PATENT DOCUMENTS

| | | | | |
|---|---|---|---|---|
| 5,690,259 A | * | 11/1997 | Montani | B60R 9/042 |
| | | | | 224/310 |
| 2007/0102464 A1 | * | 5/2007 | Garoffolo | B60R 9/042 |
| | | | | 224/310 |
| 2016/0090017 A1 | * | 3/2016 | Aich | B60P 1/48 |
| | | | | 700/218 |
| 2016/0229350 A1 | * | 8/2016 | Ziv | B60R 9/06 |
| 2018/0272956 A1 | * | 9/2018 | Yoon | B60R 9/10 |

* cited by examiner

BICYCLE CARRIER FOR VEHICLE

TECHNICAL FIELD

The present invention relates to a bicycle carrier for a vehicle which allows a bicycle to be safely fixed and transported upside down.

BACKGROUND ART

There are two types of bicycle carriers for a vehicle in the related art.

Figure 1:
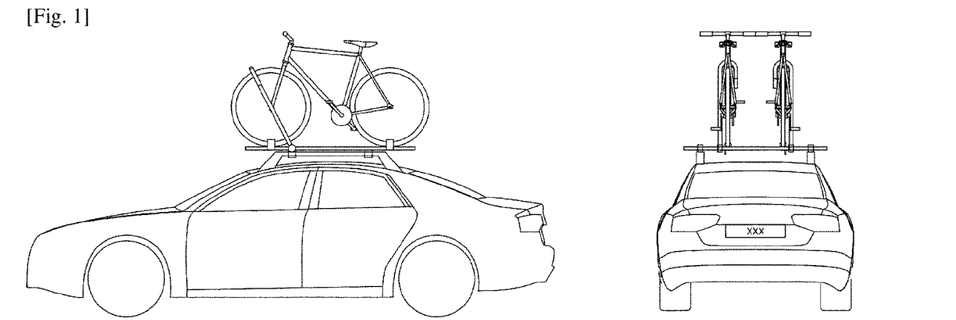
FIG. 1 is a side view and a rear view illustrating the bicycle carrier installed on a roof of the vehicle.
Figure 2:
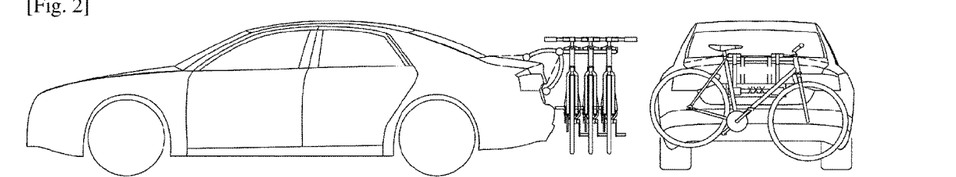
FIG. 2 is a side view and a rear view illustrating the bicycle carrier installed at a rear side of the vehicle.

FIGS. 1 to 2 are side views and rear views illustrating bicycle carriers for a vehicle in the related art, in which FIG. 1 illustrates the bicycle carrier installed on a roof of the vehicle, and FIG. 2 illustrates the bicycle carrier installed at a rear side of the vehicle.

In a case in which the bicycle is supported on the roof of the vehicle as illustrated in FIG. 1, there are problems in that it is difficult to load the bicycle onto the vehicle, fuel economy of the vehicle deteriorates because of a large amount of air resistance applied to the vehicle while the vehicle travels, serious noise occurs due to the air resistance, a loaded state of the bicycle is unstable because a center of gravity of the bicycle is high, the bicycle is separated when the vehicle severely sways, and it is difficult for a driver to check a loaded state of the bicycle while the driver drives the vehicle.

In a case in which the bicycle is loaded onto a rear surface of the vehicle as illustrated in FIG. 2, there are problems in that there is concern that the vehicle will be damaged and fuel economy will deteriorate because a bicycle weight is concentrated at a rear side of the vehicle, safety driving deteriorates because the bicycle covers a number plate and tail lamps of the vehicle, it is impossible for a driver to check a loaded state of the bicycle while the driver drives the vehicle, and the bicycle and the vehicle are damaged because the bicycle comes into contact with the vehicle while the vehicle travels as well as while the bicycle is being installed at the rear of the vehicle.

DISCLOSURE

Technical Problem

The present invention has been made in consideration of the aforementioned problems of the bicycle carrier for a vehicle in the related art, and an object of the present invention is to prevent damage to a vehicle and a bicycle caused by contact between the vehicle and the bicycle, by installing the bicycle at an upper side of a rear trunk of the vehicle after turning the bicycle upside down and by preventing the contact between the vehicle and the bicycle, to ensure fuel economy of the vehicle by maximally reducing air resistance caused by the bicycle, to enable a driver to check a loaded state of the bicycle even while the driver drives the vehicle, and to prevent the bicycle from covering tail lamps and a number plate of the vehicle.

Technical Solution

To achieve the object, the present invention provides a bicycle carrier for a vehicle, which is used to load a bicycle onto the vehicle and transport the bicycle, the bicycle carrier including:

a base support rod 10 which is disposed horizontally and has an elongated cylindrical shape;

a vertical support 20 which is rotatably connected to the base support rod 10, is supported on a rear surface of a trunk of the vehicle, has a horizontal portion 22 on which one or more shock absorbing members 24 are mounted, and has mainly a U shape, and a cylindrical cross section;

a horizontal support 30 which is rotatably connected to the base support rod 10 so as to form a fixed angle with the vertical support 20, is supported on an upper surface of the trunk of the vehicle, has a portion which is in direct contact with the upper surface of the trunk of the vehicle and on which one or more shock absorbing members 34 are mounted, and has mainly a U shape, and a cylindrical cross section;

a bicycle holder 40 which is rotatably connected to the base support rod 10, has a rotating wheel 43 which is installed at one end portion thereof at a side opposite to the base support rod and supported on a rear glass of the vehicle, has mainly a U shape, has a longer length than the horizontal support 30, and supports a bicycle frame;

an angle fixing holder 50 which is connected between the horizontal support 30 and the bicycle holder 40 and fixes an angle between the horizontal support and the bicycle holder;

two handlebar fixing holders 60 which are slidably installed at both sides of the base support rod 10 and fix both handlebars 110 of the bicycle;

a bicycle frame fixing holder 70 which is slidably installed on any one of or both support rods 42 and 44 which are parallel to each other and constitute the bicycle holder 40, and fixes a horizontal frame 120 of the bicycle; and three fixing straps 80; 82, 83, and 84 which are connected to both end portions of the base support rod 10 and one end portion of the horizontal support 30, are coupled to desired portions of the vehicle, and are adjustable in length, wherein the three fixing straps 80 are fixed to the vehicle and securely tightened, the bicycle 100 is turned upside down, the horizontal frame 120 of the bicycle is fixed to the bicycle frame fixing holder 70, and both the handlebars 110 of the bicycle are fixed to the two handlebar fixing holders 60, respectively, such that the bicycle is safely fixed to the vehicle and transported.

In the present invention, covers 72 and 62 may be attached to the bicycle frame fixing holder 70 and the two handlebar fixing holder 60, respectively, and the covers 72 and 62 may be closed and locked after the bicycle is installed.

In addition, the angle fixing holder 50 may be adjusted to several steps in accordance with a shape of the vehicle or the bicycle, and if necessary, the angle fixing holder 50 may be separated, and a trunk of the vehicle may be opened in a state in which the bicycle is mounted.

Meanwhile, the bicycle frame fixing holder 70 may be in the form of a cantilevered beam, and may have a structure in which the cover 72 is opened and closed in the bicycle frame fixing holder 70.

In addition, an elongated cylindrical inclined frame support rod 90, which has a bent end in order to additionally support an inclined frame 130 of the bicycle, may be installed on the bicycle frame fixing holder 70, an inclined frame fixing holder 92, which fixes the inclined frame 130 of the bicycle, may be installed at an end portion of the inclined frame support rod 90, the inclined frame support rod 90 and the inclined frame fixing holder 92 may be rotatable, and the inclined frame support rod 90 may be adjustable in length.

In addition, a compression fixing member 150 may be detachably and additionally installed on the bicycle holder 40, and the compression fixing member 150 may be fixed to the rear glass of the vehicle by air compression.

Advantageous Effects

According to the bicycle carrier for a vehicle according to the present invention which is configured as described above, it is possible to prevent damage to the vehicle and the bicycle caused by contact between the vehicle and the bicycle, by installing the bicycle at the upper side of the rear trunk of the vehicle after turning the bicycle upside down and by preventing the contact between the vehicle and the bicycle, to ensure fuel economy of the vehicle by maximally reducing air resistance caused by the bicycle, to enable a driver to check a loaded state of the bicycle even while the driver drives the vehicle, and to prevent the bicycle from covering tail lamps and a number plate of the vehicle, thereby assisting in safe driving.

In addition, convenience for a driver is not degraded because the driver may freely open and close the trunk of the vehicle even in a state in which the bicycle is mounted.

In addition, it is possible to easily load the bicycle onto the carrier.

DESCRIPTION OF DRAWINGS

FIGS. 1 to 2 are views illustrating bicycle carriers for a vehicle in the related art, in which

FIG. 6 is a view illustrating another example in which the bicycle is installed on different types of vehicles, in which FIG. 6A illustrates a case in which the bicycle is installed on a van, FIG. 6B is a side view illustrating a case in which the bicycle is installed on a sport-utility vehicle (SUV), and FIG. 6C is a cross-sectional view of a bicycle frame fixing holder 70 in this case.

FIG. 7 is a view illustrating another exemplary embodiment in which an additional fixing mechanism for the bicycle according to the present invention is adopted, in which FIG. 6A is a perspective view illustrating a state in which the bicycle is installed, FIG. 6B is a perspective view of the additional fixing mechanism, and FIG. 6C is a side view illustrating a state in which the additional fixing mechanism moves.

BEST MODE

Figure 3:
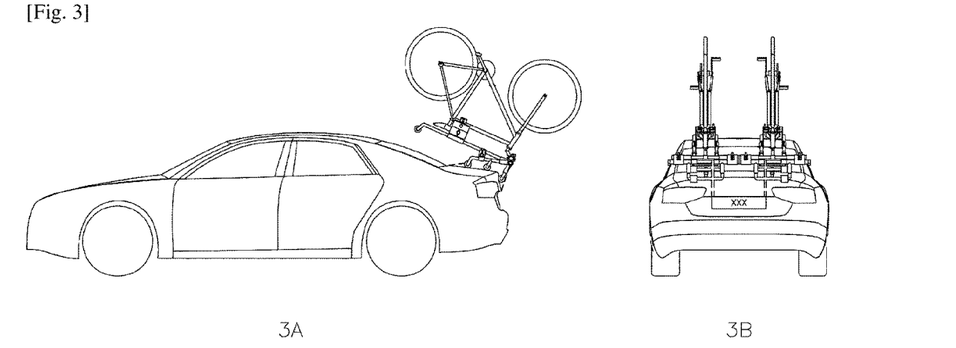
FIG. 3 is a side view and a rear view of a vehicle on which a bicycle is loaded in accordance with the present invention.

FIG. 3 is a side view and a rear view of a vehicle on which a bicycle is loaded in accordance with the present invention. As illustrated, according to the present invention, the bicycle is installed at an upper side of a trunk of the vehicle after being turned upside down, such that a center of gravity of the bicycle is lowered, air resistance is reduced, and the bicycle does not cover tail lamps and a number plate, and as a result, the problems of the bicycle carrier in the related art are solved.

Figure 4:
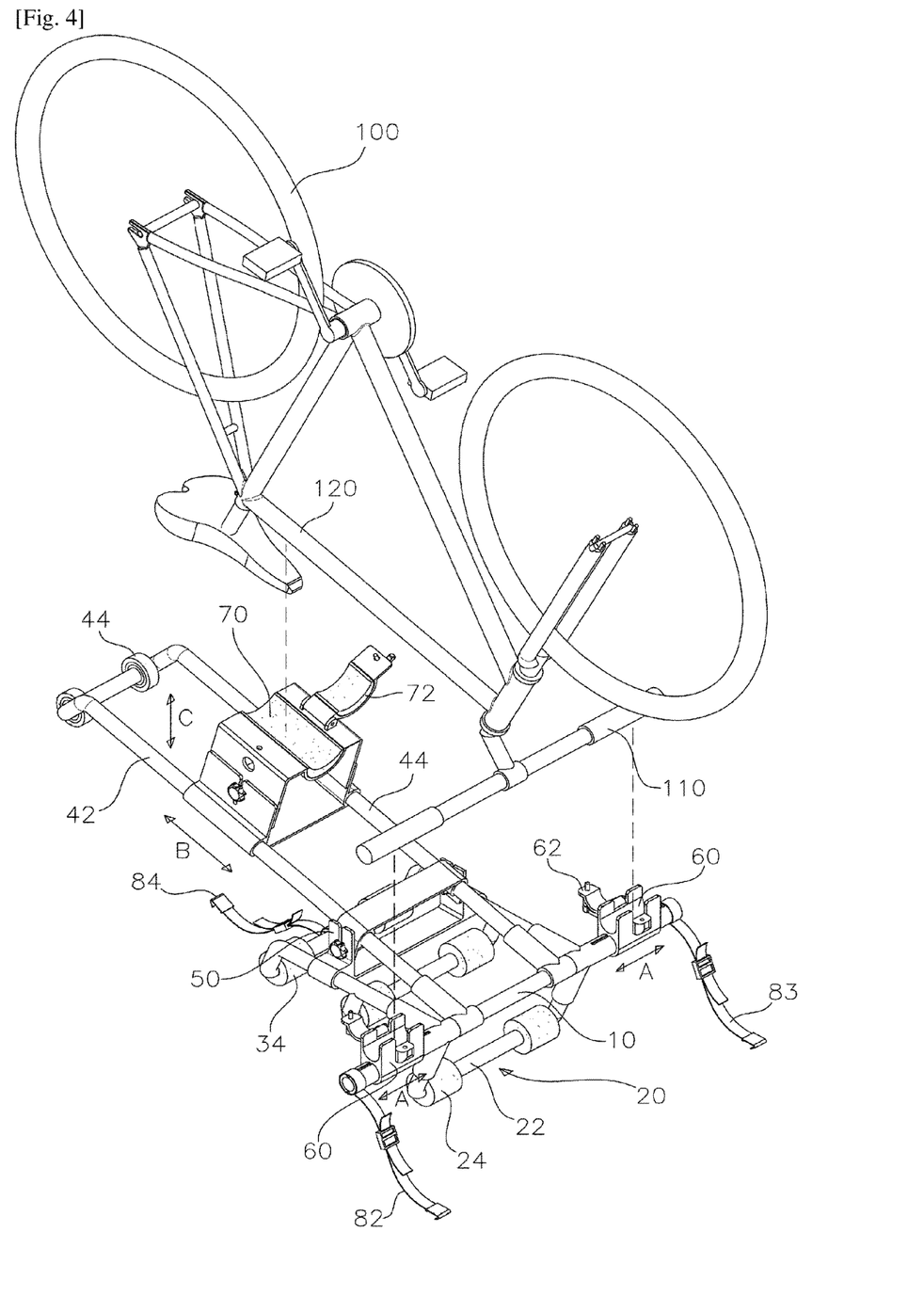
FIG. 4 is a perspective view illustrating a state in which a bicycle is installed on a bicycle carrier according to the present invention.
Figure 5:
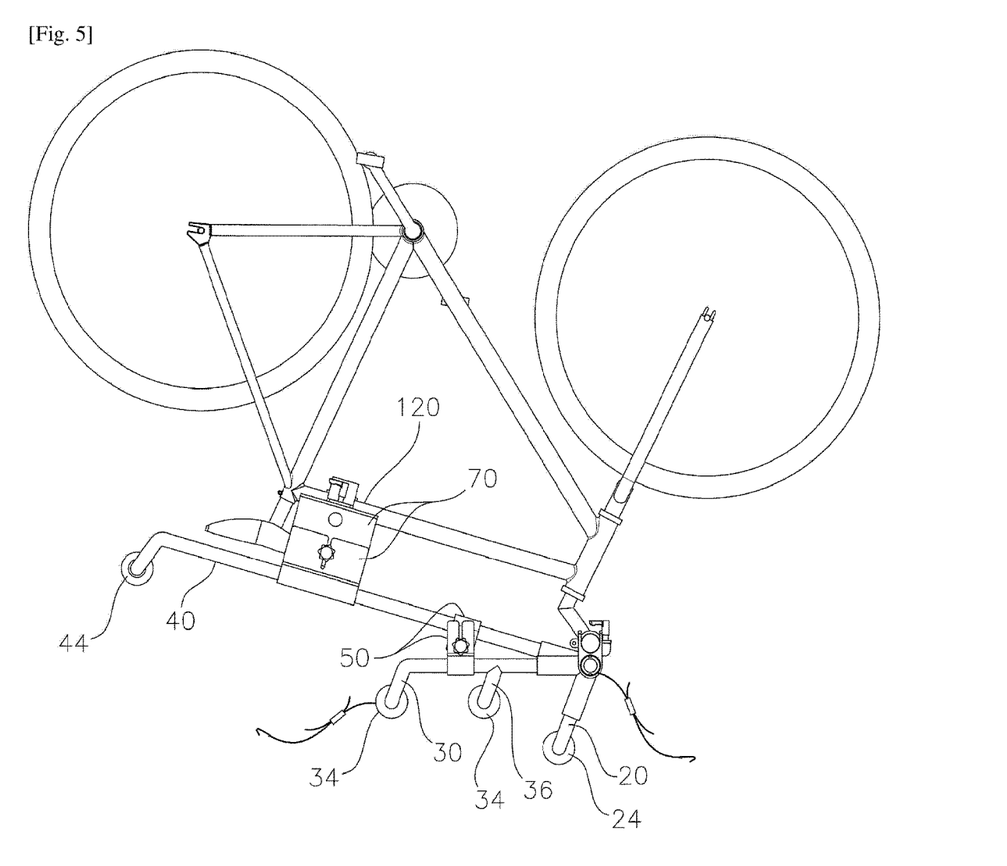
FIG. 5 is a side view illustrating a state in which the bicycle installed.

FIG. 4 is a perspective view illustrating a state in which a bicycle is installed on a bicycle carrier according to the present invention, and FIG. 5 is a side view illustrating a state in which the bicycle installed.

A bicycle carrier for a vehicle according to the present invention is configured based on an elongated cylindrical base support rod 10 disposed horizontally. A U-shaped vertical support 20 has a cross section having a cylindrical shape and is rotatably connected to the base support rod 10, the vertical support 20 is supported on a rear surface of a trunk of a vehicle (see FIG. 3A), and two shock absorbing members 24 are mounted on a horizontal portion 22 of the vertical support 20 which defines a lower end portion of the vertical support 20. The two shock absorbing members 24 are illustrated in the drawings, but the number of shock absorbing members 24 may be one, or two or more as necessary.

A horizontal support 30 is also rotatably connected to the base support rod 10 while forming a fixed angle with the vertical support 20. The horizontal support 30 has mainly a U shape and has a cross section having a cylindrical shape, and the horizontal support 30 is supported on an upper surface of the trunk of the vehicle in a state in which the bicycle carrier is installed (see FIG. 3A). As illustrated, an end portion of the horizontal support 30 has a horizontal portion bent downward, and shock absorbing members 34 are mounted on the horizontal portion that comes into direct contact with the upper surface of the trunk. Likewise, two shock absorbing members 24 are illustrated in the drawings, but the number of shock absorbing members 24 may be one, or two or more. In addition, as illustrated in the drawings, another support 36 may be installed at a middle portion, if necessary, in order to support the bicycle which is heavy as a load, and the shock absorbing member 34 may also be further installed on the support 36.

A bicycle holder 40 is rotatably connected to the base support rod 10 inside the horizontal support 30, if possible. A rotating wheel 43, which is supported on a rear glass of the vehicle, is installed at one end portion of the bicycle holder 40 at a side opposite to the base support rod. The bicycle holder 40 has mainly a U shape, and generally has a longer length than the horizontal support 30.

An angle fixing holder 50 for fixing an angle between the horizontal support 30 and the bicycle holder 40 is connected between the horizontal support and the bicycle holder. The angle fixing holder 50 has a structure capable of adjusting an angle between the horizontal support and the bicycle holder to several steps in accordance with the shape of the vehicle or the bicycle. The angle fixing holder 50 may have any structure as long as the structure has a projection-and-recess engagement structure as illustrated and may arbitrarily adjust an angle by means of a rotating means such as a screw. In addition, the angle fixing holder 50 may be separated from the horizontal support 30, and the user may open the trunk of the vehicle in a state in which the bicycle is mounted after the angle fixing holder is separated as described above, and as a result, the user may freely open and close the trunk of the vehicle even in a state in which the bicycle carrier is installed on the vehicle (see FIG. 8B).

Two handlebar fixing holders 60 for fixing handlebars 110 at both sides of the bicycle are slidably installed at both sides of the base support rod 10. The two handlebar fixing holders 60 may be moved on the base support rod 10 in a direction indicated by arrow A, and as a result, an appropriate interval between the two handlebar fixing holders 60 may be maintained corresponding to a size of the handlebar of the bicycle.

In addition, a bicycle frame fixing holder 70 is slidably installed on any one of or both support rods 42 and 44 which are parallel to each other and constitute the bicycle holder 40, and a horizontal frame 120 of the bicycle may be fixed to the bicycle frame fixing holder 70. The bicycle frame fixing holder 70 may slide in a direction indicated by arrow B, and a height of the bicycle frame fixing holder 70 may be adjusted in a direction indicated by arrow C, and similarly, the bicycle frame fixing holder 70 may securely, safely, and appropriately fix the horizontal frame 120 of the bicycle in accordance with a size of the bicycle.

Covers 72 and 62 are attached to the bicycle frame fixing holder 70 and the two handlebar fixing holders 60, respectively, and shock absorbing members are installed in the fixing holder, respectively, and the covers 72 and 62 may be closed and locked after the bicycle is installed.

In addition, three fixing straps 80; 82, 83, and 84 are connected to both end portions of the base support rod 10 and one end portion of the horizontal support 30, respectively, and the fixing straps are coupled to desired portions of the vehicle in a state in which the bicycle carrier is installed, and lengths of the fixing straps may be adjusted, such that the fixing straps may securely fix the bicycle carrier to the vehicle. For example, the two fixing straps 82 and 83 may be fixed to a lower edge portion of the trunk of the vehicle, and the remaining fixing strap 84 may be fastened and fixed to the opposite edge of the trunk of the vehicle, but the fixing straps may be fixed to other portions as necessary.

According to the bicycle carrier of the present invention which is configured as described above, the three fixing straps 80 are fixed to the vehicle and securely tightened, the bicycle 100 is turned upside down, the bicycle horizontal frame 120 is fixed to the bicycle frame fixing holder 70, and then the two handlebars 110 of the bicycle are fixed to the two handlebar fixing holders 60, respectively, such that the bicycle may be safely fixed to the vehicle and then may be transported.

Meanwhile, if necessary, the fixing straps may be installed and fixed to other portions of the bicycle carrier.

Figure 6:
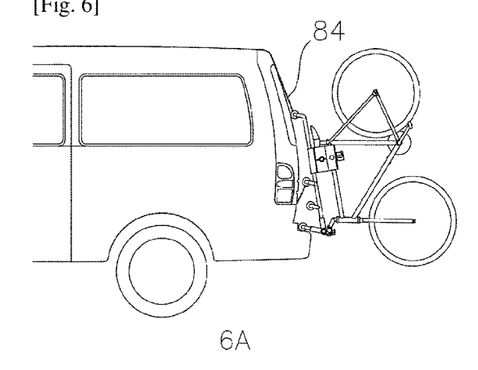

FIG. 6 is a view illustrating another example in which the bicycle is installed on different types of vehicles, in which FIG. 6A illustrates a case in which the bicycle is installed on a van, FIG. 6B is a side view illustrating a case in which the bicycle is installed on a sport-utility vehicle (SUV), and FIG. 6C is a cross-sectional view of the bicycle frame fixing holder 70 in this case.

In the present exemplary embodiment, the fixing strap 84 may be connected to one end portion of the bicycle holder 40 and may be fixed to an upper edge portion of the trunk of the vehicle, but the present invention is not necessarily limited thereto. In addition, in this case, the bicycle frame fixing holder 70 is configured in the form of a cantilevered beam so that the bicycle is installed approximately vertically, and the horizontal frame 120 of the bicycle may be fixed by being moved in a direction indicated by arrow D toward one side of the bicycle frame fixing holder 70. In this case, the cover 72 is structured to be opened and closed in the bicycle frame fixing holder 70 so as to prevent the separation of the bicycle. That is, as illustrated by a break line, the structure in which the cover 72 is opened and closed in the bicycle frame fixing holder 70 is safer.

Figure 7:
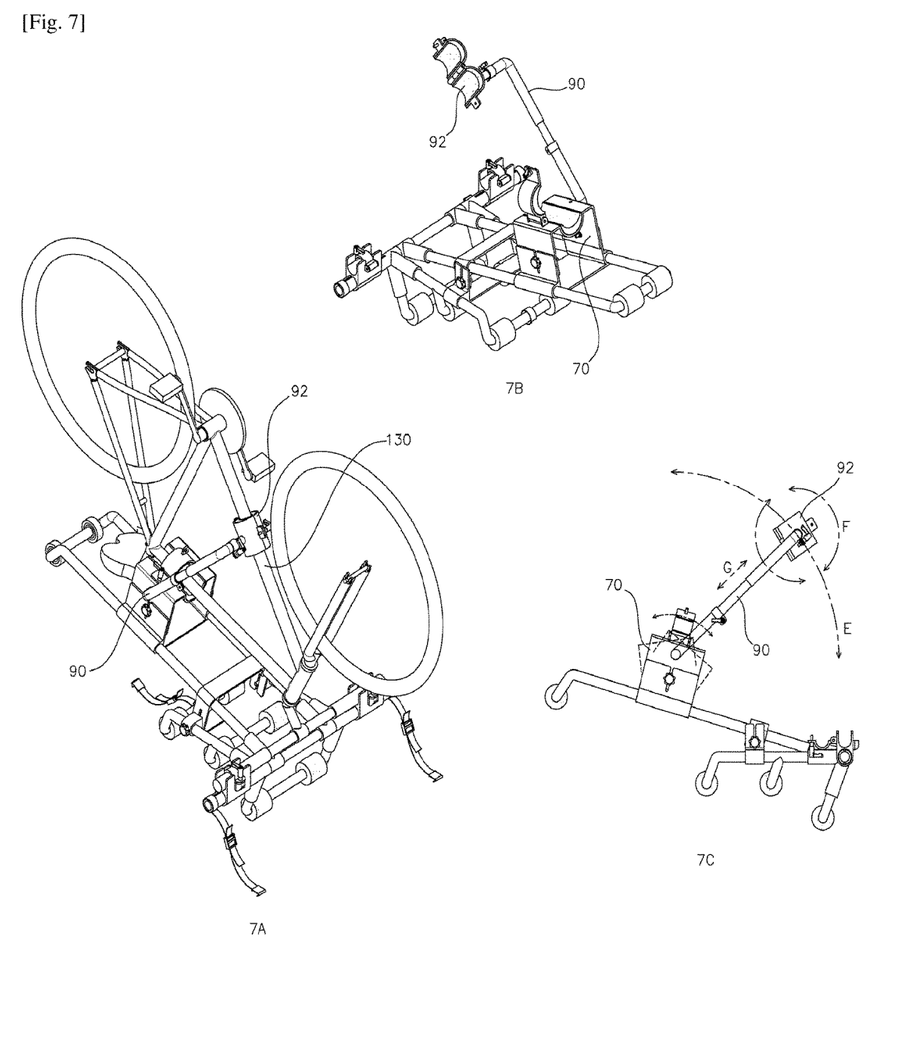

FIG. 7 is a view illustrating another exemplary embodiment in which an additional fixing mechanism for the bicycle according to the present invention is adopted, in which FIG. 7A is a perspective view illustrating a state in which the bicycle is installed, FIG. 7B is a perspective view of the additional fixing mechanism, and FIG. 7C is a side view illustrating a state in which the additional fixing mechanism moves.

As illustrated, to more assuredly and safely fix the bicycle, a "¬"-shaped cylindrical inclined frame support rod 90, which is elongated and has a bent end, is installed on the bicycle frame fixing holder 70 in order to additionally support an inclined frame 130 of the bicycle. An inclined frame fixing holder 92 is installed at an end portion of the inclined frame support rod 90, and the structure of the fixing holder 92 may adopt a structure which is opened and closed by using the cover similar to the fixing holders 60 and 70. In addition, as illustrated in FIG. 6C, the inclined frame support rod 90 may be rotated in a direction indicated by arrow E and the inclined frame fixing holder 92 may be rotated in a direction indicated by arrow F in accordance with a size and an angle of the inclined frame 130 of the bicycle. In addition, a length of the inclined frame support rod 90 may be adjusted in a direction indicated by arrow G.

Figure 8:
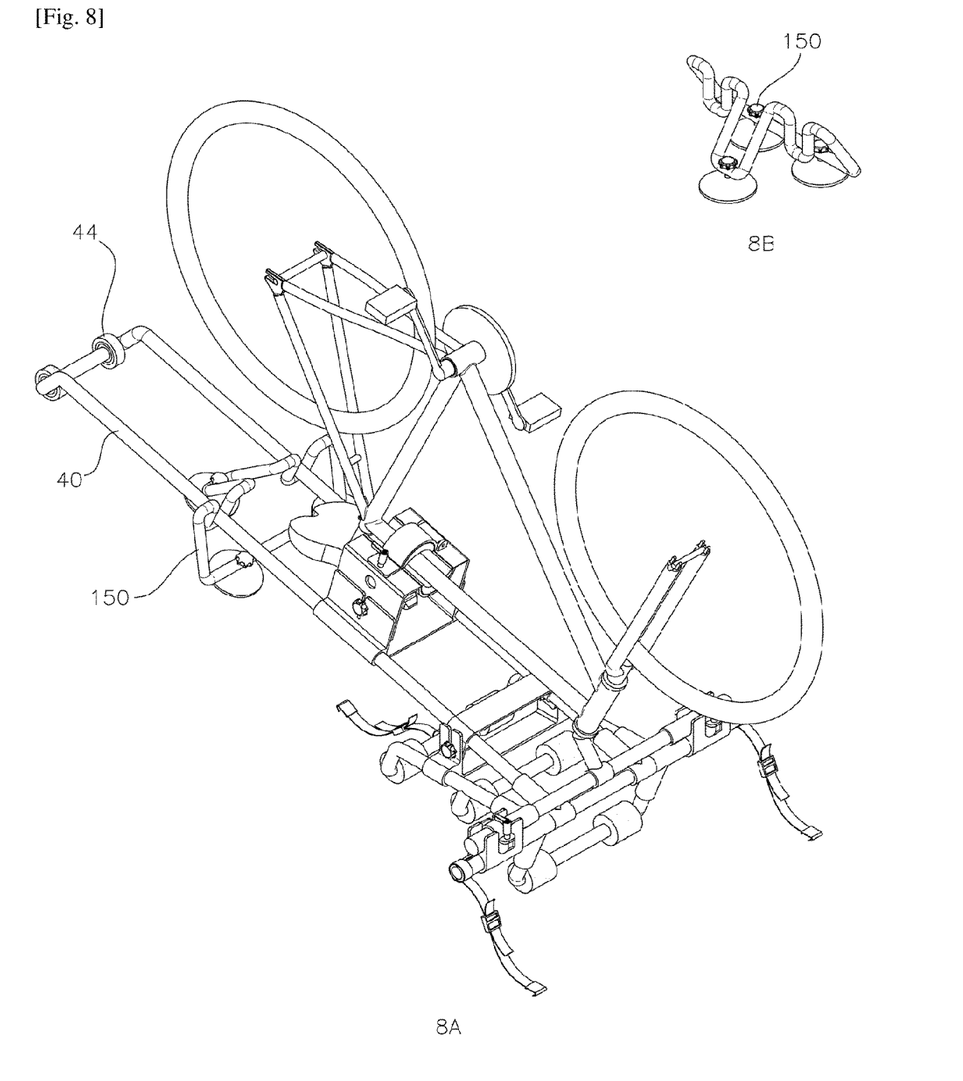
FIGS. 8 and 9 are views illustrating still another exemplary embodiment of the present invention.
Figure 9:
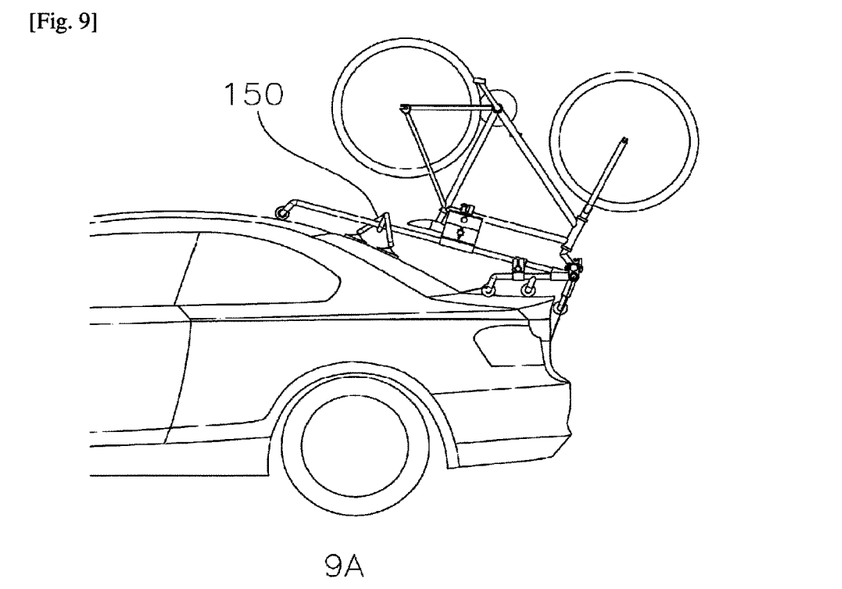

FIGS. 8 and 9 are views illustrating still another exemplary embodiment of the present invention.

In the present exemplary embodiment, a compression fixing member 150 is additionally and detachably installed on the bicycle holder 40. The compression fixing member 150 may adopt a structure that is fixed to the rear glass of the vehicle by air compression. For example, the compression fixing member 150, which has a concave-convex framework so as to be fitted with and separated from both the support rods 42 and 44 of the bicycle holder 40, is installed, and the compression fixing member 150 is compressed against the rear glass of the vehicle by using an air suctioning device, and as a result, it is possible to more safely and assuredly fix the bicycle. The configuration illustrated in the drawings is just an example, and any structure may be included in the scope of the present invention as long as the structure may be detachably coupled to the bicycle holder and attached to the rear glass of the vehicle by suction. In addition, three compression plates are illustrated in the drawings, but the number of compression plates may be changed as necessary.

FIG. 9 is a side view illustrating a state in which the bicycle holder having this structure is used, in which FIG. 9A illustrates a state in which the compression fixing member 150 is coupled, and FIG. 9B illustrates a state in which the compression fixing member is separated.

As illustrated in FIG. 9A, the bicycle carrier is securely fixed to the rear glass of the vehicle in a state in which the compression fixing member 150 is installed, and as a result, it is possible to more stably transport the bicycle.

Meanwhile, as described above, only the compression fixing member 150 and the angle fixing holder 50 may be separated in order to open the trunk of the vehicle. When the trunk is opened in a direction indicated by arrow a in this state, the bicycle holder 40 is moved in a direction indicated by arrow b while being splayed, and the rotating wheel 43 installed at the front end portion of the bicycle holder is moved along a roof of the vehicle, and as a result, the trunk may be freely opened and closed in a state in which the bicycle is still safely mounted.

The invention claimed is:

1. A bicycle carrier for a vehicle, which is used to load a bicycle onto the vehicle and transport the bicycle, the bicycle carrier comprising:
   a base support rod 10 which is disposed horizontally and has a cylindrical shape;

a vertical support 20 which is rotatably connected to the base support rod 10, is supported on a rear surface of a trunk of the vehicle, has a horizontal portion 22 on which one or more shock absorbing members 24 are mounted, and has mainly a U shape, and a cylindrical cross section;

a horizontal support 30 which is rotatably connected to the base support rod 10 so as to form a fixed angle with the vertical support 20, is supported on an upper surface of the trunk of the vehicle, has a portion which is in direct contact with the upper surface of the trunk of the vehicle and on which one or more shock absorbing members 34 are mounted, and has mainly a U shape, and a cylindrical cross section;

a bicycle holder 40 which is rotatably connected to the base support rod 10, has a rotating wheel 43 which is installed at one end portion thereof at a side opposite to the base support rod and supported on a rear glass of the vehicle, has mainly a U shape, has a longer length than the horizontal support 30, and supports a bicycle frame;

an angle fixing holder 50 which is connected between the horizontal support 30 and the bicycle holder 40 and fixes an angle between the horizontal support and the bicycle holder;

two handlebar fixing holders 60 which are slidably installed at both sides of the base support rod 10 and fix both handlebars 110 of the bicycle;

a bicycle frame fixing holder 70 which is slidably installed on any one of or both support rods 42 and 44 which are parallel to each other and constitute the bicycle holder 40, and fixes a horizontal frame 120 of the bicycle; and three fixing straps 80; 82, 83, and 84 which are connected to both end portions of the base support rod 10 and one end portion of the horizontal support 30, are coupled to desired portions of the vehicle, and are adjustable in length, wherein the three fixing straps 80 are fixed to the vehicle and securely tightened, the bicycle 100 is turned upside down, the horizontal frame 120 of the bicycle is fixed to the bicycle frame fixing holder 70, and both the handlebars 110 of the bicycle are fixed to the two handlebar fixing holders 60, respectively, such that the bicycle is safely fixed to the vehicle and transported.

2. The bicycle carrier of claim 1, wherein covers 72 and 62 are attached to the bicycle frame fixing holder 70 and the two handlebar fixing holder 60, respectively, and the covers 72 and 62 are closed and locked after the bicycle is installed.

3. The bicycle carrier of claim 2, wherein the angle fixing holder 50 is adjustable to several steps in accordance with a shape of the vehicle or the bicycle.

4. The bicycle carrier of claim 3, wherein the angle fixing holder 50 is separable, and a trunk of the vehicle is openable in a state in which the bicycle is mounted after the angle fixing holder is separated.

5. The bicycle carrier of claim 4, wherein the bicycle frame fixing holder 70 is in the form of a cantilevered beam, and has a structure which the cover 72 is opened and closed in the bicycle frame fixing holder 70.

6. The bicycle carrier of claim 4, wherein a cylindrical inclined frame support rod 90, which has a bent end in order to additionally support an inclined frame 130 of the bicycle, is installed on the bicycle frame fixing holder 70, an inclined frame fixing holder 92, which fixes the inclined frame 130 of the bicycle, is installed at an end portion of the inclined frame support rod 90, the inclined frame support rod 90 and the inclined frame fixing holder 92 are rotatable, and the inclined frame support rod 90 is adjustable in length.

7. The bicycle carrier of claim 4, wherein a compression fixing member 150 is detachably and additionally installed on the bicycle holder 40, and the compression fixing member 150 is fixed to the rear glass of the vehicle by air compression.

* * * * *